April 26, 1960 — R. H. PALMER — 2,933,914
MEANS AND METHOD FOR FLESHING PELTS
Filed June 4, 1957
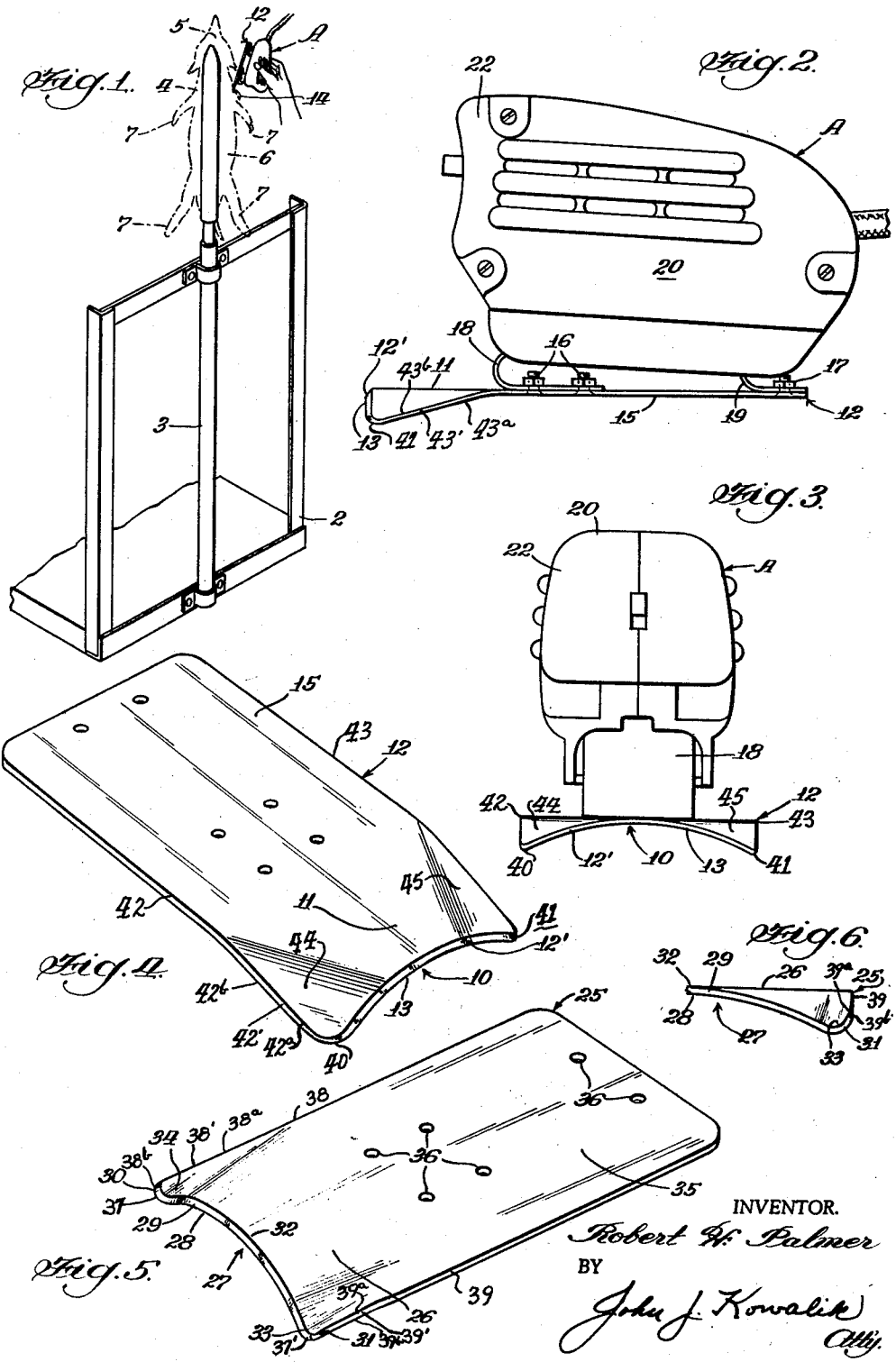
INVENTOR.
Robert H. Palmer
BY
John J. Kowalik
Atty.

United States Patent Office 2,933,914
Patented Apr. 26, 1960

2,933,914
MEANS AND METHOD FOR FLESHING PELTS
Robert H. Palmer, Chicago, Ill.
Application June 4, 1957, Serial No. 663,441
5 Claims. (Cl. 69—20)

This invention relates to a method for removing the flesh from pelts and a means usable according to the method for efficiently and easily accomplishing the method.

Current practice in removing fat and flesh from pelts particularly from expensive furs such as mink involves after skinning inverting the pelt with the fleshy side out and freezing it after which it is staked inside out on a post or board. It is then fleshed by scraping with a dull knife to remove the tissue. Some attempts have also been made by scraping with a wire which is held in a suitable U-shaped holder or reciprocated lengthwise transversely of the direction of application by the operator. All of these methods have proved inefficient inasmuch as they are tedious and require a highly experienced operator to perform the work.

The object of my invention is to provide a novel device which will effectively flesh and which may be used with equal facility by an experienced operator as well as a novice.

A further object of the invention is to devise a novel fleshing mechanism which includes a blade having a relatively dull fleshing edge, the blade being rapidly oscillated transversely of said edge which is adapted to be directed angularly and lightly engaged against the staked pelt and advanced along the pelt in the direction of reciprocation as the flesh peels off the pelt.

Another object is to provide a novel blade in the mechanism described which the blade includes a curved leading portion contoured to the staked pelt and in one embodiment thereof has novel contoured portions for reaching into creases or folds which are normally inaccessible areas of the pelt with the tools in current use.

A different object of the invention is to provide a novel method for removing the flesh from pelts which comprises rapidly oscillating a blade against the fleshy side of a pelt while rapidly advancing the blade in the direction of its reciprocation whereby peeling the flesh off the pelt.

These and other objects of the invention will become more apparent from the specification and the drawing, wherein:

Figure 1 is a perspective view of a stand with a pelt staked thereon and illustrating the operation of the fleshing device;

Figure 2 is a side elevational view of the fleshing device with one form of blade applied thereto;

Figure 3 is a front view of the structure shown in Figure 2;

Figure 4 is a top front perspective view of the blade in Figures 2 and 3;

Figures 5 and 6 illustrate a modified form of blade, Figure 5 being a front top perspective view, and Figure 6 a fragmentary front view.

Describing the invention in detail and having particular reference to Figures 1-4 of the drawing, there is shown a stand 2 including an upright post 3 upon the upper end of which is staked an inverted frozen mink pelt 4 having its head portion 5 uppermost and the body portion 6 wrapped about the post with the legs 7 dangling alongside.

The general peripheral contour of the pelt is convex and somewhat cylindrical against which fits the inner concave contour 10 of the forward or leading portion 11 of the fleshing blade 12 which constitutes the operating tool of the fleshing unit A.

The leading portion 11 of the blade is convexed outwardly and is beveled externally at 12' to provide a dull leading or cutting edge 13 which, as seen in Figure 1, is lightly engaged with the pelt, the blade being oriented lengthwise generally longitudinally of the pelt form and the forward portion of the blade substantially pocketing the frozen pelt shell.

It will be seen from a consideration of Figure 1 that the blade is held at a slight angle to the length of the pelt. This angle of incidence of the blade to the periphery of the pelt will, of course, vary depending principally upon the particular part of the body upon which the operation is at the moment being performed and I have found from personal observation that the adjustment of the tool is almost instinctive. Even the amatuer becomes quickly adept.

Normally the fleshing or flesh removing operation proceeds from top to bottom. However, it may, if desired, be accomplished reversely that is from bottom up. The unit A is advanced lengthwise of the pelt as the tissue at 15 (Fig. 1) peels off.

The blade 12 has a generally flat aft or trailing portion 15 which is suitably attached by any means such as bolts or nuts 16 and 17 to the lugs 18 and 19 of the vibrator 20 which may be of any form desired which oscillates the blade with quick strokes parallel to the plane thereof. The output members 18 and 19 are oscillated by the electrical oscillator of any conventional form which includes the case 22 which may be held in the operator's hand as shown in Figure 1.

A supplementary feature of the structure of Figures 1 to 4 resides in the provision of digging points 40 and 41 at the mergency of the leading edge 13 with the lateral edges 42 and 43 respectively of the plate 10. These points are adapted for scraping out crooks and joints in the pelt and the inward offsets at 44 and 45 along the lateral edges of the blade due to the curvature of portion 11 accommodate insertion of the unit under legs and the like. Furthermore the forward portions 42', 43' of the edges 42 and 43 of the blade are inclined downwardly and forwardly so that during longitudinal reciprocation of the blade 10 the edge portions 42', 43' extend transversely to the line of reciprocation of the cutter which is planewise and lengthwise of the same. Thus either edge portion 42', 43' is useful to scuff off the fat tissue as the machine is advanced lengthwise of the blade. It will be noted that the edge portion 42', 43' provide inner and outer dull scraping edges 42a, 42b and 43a, 43b respectively and that the inner edges are disposed slightly inwardly laterally of the blade than the outer edges so that the unit may be held in several positions consistent with convenience and operational effectiveness to obtain best results.

Referring now to Figures 5 and 6, the blade generally indicated 25 comprises a leading portion 26 of arcuate contour in end elevation and providing an internal body-receiving pocket 27. The leading edge 28 is externally beveled at 29 to provide a dull shearing or scuffing edge. The leading portion of the blade comprises outturned lateral flanges 30 and 31 which define with the intermediate curved segment 32 of the leading portion of the blade sharp corners or crooks 33 and 34 which are adapted to be entered in the folds or junctures of the legs with the body and the like. The blade 25 has a substantially flat aft attaching portion 35 which is adapted to be attached to the arms of the oscillator through the apertures 36.

The pockets 33, 34 also permit folds or legs etc., to enter over the blade and the points 37, 37' developed thereby provide outwardly curved scuffing edges. In addition the upstanding flanges 30 and 31 are between 45° and 60° with reference to the plane of the flat portion 35 and the portions 38' and 39' of the side edges 38, 39 of the blade incline forwardly and inwardly and thus extend transversely to the line of reciprocation of the cutter. The external or outer cutting edges 38a, 39a of the portion 38, 39 are disposed laterally inwardly of the internal cutting edges 38b, 39b of said portions. Thus the unit may be held in several positions with said edges 38a, 39a, 38b or 39b engaged to scuff off the flesh when it is convenient or operationally efficient to do so.

It will be understood that I have developed a novel method of fleshing a pelt which includes freezing and shaping it into a somewhat round or generally cylindrical form and staking it and then advancing a blade or scuffing tool lengthwise of the shape while rapidly oscillating the blade in the direction of its advance and while holding the blade at an acute angle to the shape. I have found from actual practice that this method not only removes the flesh clean, but even an amateur successfully performs the operation at a greatly increased productive rate without damaging the pelt.

I claim:

1. A fleshing tool comprising blade having a concave-convex leading portion and a trailing portion, a dull scuffing edge on the leading portion, the shape of said portion of said blade forming a pelt receiving internal pocket shallowing from said leading portion toward said trailing portion, and means operatively connected to said blade for rapidly oscillating the same transversely of said edge.

2. An animal fleshing device comprising a tool having a leading portion having a dull flesh scuffing edge, and means connected to the blade for linearly oscillating the blade transversely of said edge and further characterized in that said leading portion is curved lengthwise of said edge and providing an internal pocket for receiving a preformed animal pelt shape and said pocket tapering from said leading portion and progressively becoming shallower.

3. An animal fleshing device comprising a tool having a leading portion having a dull flesh scuffing edge, and means connected to the blade for linearly oscillating the blade transversely of said edge and further characterized in that said leading portion is curved lengthwise of said edge and having lateral edges with forward portions inclined to the plane of said tool and providing cutting edges extending transversely to the direction of reciprocation of the tool, said leading portion having projections at opposite sides flanking the convex side of the leading portion and extending generally tangentially thereof.

4. An animal pelt fleshing device comprising a blade having a trailing portion and a leading end portion with a fleshing edge thereon, means for oscillating said blade endwise, leading portion curved transversely of the blade and providing an internal pocket extending lengthwise of the blade, said leading portion having lateral edges inclined inwardly and forwardly from said trailing portion and each lateral edge having inner and outer cutting edges extending angularly to the line of reciprocation of the blade and said inner and outer cutting edges of each lateral edge displaced laterally with respect to each other.

5. A fleshing blade comprising a planar body having an undulant cutting edge including a major curved portion terminating in end portions reversely curved on a sharp radius from opposite ends of the major curved portion.

References Cited in the file of this patent

UNITED STATES PATENTS 1,400,379  Schollmeyer _____ Dec. 13, 1921

FOREIGN PATENTS 85,280  Norway _____ Apr. 4, 1955